US012531174B2

(12) United States Patent
Lan et al.

(10) Patent No.: US 12,531,174 B2
(45) Date of Patent: Jan. 20, 2026

(54) R-T-B-BASED PERMANENT MAGNET MATERIAL, PREPARATION METHOD THEREFOR AND USE THEREOF

(71) Applicant: FUJIAN GOLDEN DRAGON RARE-EARTH Co., Ltd., Fujian (CN)

(72) Inventors: Qin Lan, Fujian (CN); Jiaying Huang, Fujian (CN); Dakun Chen, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 246 days.

(21) Appl. No.: 17/600,106

(22) PCT Filed: Jul. 7, 2020

(86) PCT No.: PCT/CN2020/100585
§ 371 (c)(1),
(2) Date: Sep. 30, 2021

(87) PCT Pub. No.: WO2021/109568
PCT Pub. Date: Jun. 10, 2021

(65) Prior Publication Data

US 2022/0293309 A1 Sep. 15, 2022

(30) Foreign Application Priority Data

Dec. 4, 2019 (CN) ........................ 201911224209.5

(51) Int. Cl.
*H01F 1/057* (2006.01)
*B22F 3/24* (2006.01)
(Continued)

(52) U.S. Cl.
CPC ......... *H01F 1/0557* (2013.01); *C22C 38/002* (2013.01); *C22C 38/005* (2013.01);
(Continued)

(58) Field of Classification Search
None
See application file for complete search history.

(56) References Cited

U.S. PATENT DOCUMENTS

2006/0137767 A1* 6/2006 Yamamoto .............. C22C 38/10
148/302
2014/0132377 A1* 5/2014 Nakajima ................ B22F 3/16
420/83
(Continued)

FOREIGN PATENT DOCUMENTS

CN 102296228 A 12/2011
CN 102304663 A 1/2012
(Continued)

OTHER PUBLICATIONS

Sep. 28, 2020 International Search Report issued in International Patent Application No. PCT/CN2020/100585.
Sep. 28, 2020 Written Opinion of the International Searching Authority issued in International Patent Application No. PCT/CN2020/100585.

*Primary Examiner* — Xiaowei Su
(74) *Attorney, Agent, or Firm* — Houston Beshining Law Office PLLC; Liangang Ye

(57) ABSTRACT

Disclosed are an R-T-B-based permanent magnet material, a preparation method therefor and the use thereof. The R-T-B-based permanent magnet material I comprises the following components: 29.0-32.5% of R including RH, 0.30 to 0.50 wt. % of Cu, 0.05 to 0.20 wt. % of Ti, 0.85 to 1.05 wt. % of B, 0.1 to 0.3 wt. % of C, 66 to 68 wt. % of Fe, wherein R is a rare earth element and R at least includes Nd; and RH is a heavy rare earth element and RH at least includes Tb or Dy, A Cu—Ti—C grain boundary phase is formed in the R-T-B-based permanent magnet material I, and Hcj is significantly improved.

3 Claims, 2 Drawing Sheets

(51) Int. Cl.

| | |
|---|---|
| ***B22F 9/04*** | (2006.01) |
| ***C22C 38/00*** | (2006.01) |
| ***C22C 38/10*** | (2006.01) |
| ***C22C 38/14*** | (2006.01) |
| ***C22C 38/16*** | (2006.01) |
| ***H01F 1/055*** | (2006.01) |
| ***H01F 1/058*** | (2006.01) |
| ***H01F 7/02*** | (2006.01) |

(52) U.S. Cl.

CPC .............. *C22C 38/10* (2013.01); *C22C 38/14* (2013.01); *C22C 38/16* (2013.01); *H01F 1/058* (2013.01); *C22C 2202/02* (2013.01)

(56) References Cited

U.S. PATENT DOCUMENTS

| | | | | |
|---|---|---|---|---|
| 2017/0250015 | A1* | 8/2017 | Miwa | C22C 33/04 |
| 2018/0182518 | A1* | 6/2018 | Satoh | B22F 3/16 |
| 2019/0080827 | A1* | 3/2019 | Hidaka | H01F 1/0577 |

FOREIGN PATENT DOCUMENTS

| | | | |
|---|---|---|---|
| CN | 102938282 | A | 2/2013 |
| CN | 110993232 | A | 4/2020 |
| JP | 2000331810 | A | 11/2000 |
| JP | 2018082040 | A | 5/2018 |

* cited by examiner

R-T-B-BASED PERMANENT MAGNET MATERIAL, PREPARATION METHOD THEREFOR AND USE THEREOF

The present application is a National Stage of International Application No. PCT/CN2020/100585, filed on Jul. 7, 2020, which claims the priority of Chinese Patent Application CN201911224209.5 filed on Dec. 4, 2019, the contents of which are incorporated herein by reference in their entireties.

TECHNICAL FIELD

The present disclosure relates to an R-T-B-based permanent magnet material, a preparation method therefor and a use thereof.

BACKGROUND

Since the Permanent magnet materials were developed as the key materials for supporting electronic devices, the development direction has been towards the direction of high magnetic energy product and high coercivity. The R-T-B-based permanent magnet materials (R is at least one of the rare earth elements) are known to be the magnets of highest performance in permanent magnets, which are used in voice coil motors (VCM) of hard disk drives, motors for electric vehicles (EV, RV, PHV, etc.), motors for industrial equipment, and other motors and household appliances.

At present, in the process of preparing R-T-B permanent magnet materials, due to the insufficient purity of raw materials, a certain content of carbon will be introduced; at the same time, because the powder of neodymium-iron-boron is active and has poor liquidity, antioxidants, lubricants, release agents and other organic additives will need to be added, and a certain content of carbon will also be introduced. In the conventional preparation process, carbon can easily combine with active Nd-rich to form neodymium carbide, resulting in the reduction of intrinsic coercivity (Hcj) of the magnet.

Therefore, the current technical problem is: on one hand, the content of carbon in the alloy needs to be reduced; on the other hand, due to the preparation process or raw materials, a certain of carbon sources have to be introduced. Such a contradictory and objective technical problem urgently needs to be overcome by a new formula of R-T-B-based permanent magnet material.

CONTENT OF THE PRESENT DISCLOSURE

The technical problem to be solved in the present disclosure is for overcoming the reduction of Hcj of the magnet caused by carbon element in the R-T-B-based permanent magnet material in the prior art, thus an R-T-B-based permanent magnet material, a preparation method therefor and a use thereof are provided.

The present disclosure solves the above-mentioned technical problem through the following technical solutions:

The present disclosure provides an R-T-B-based permanent magnet material I, which comprises the following components by mass percentage:

29.0-32.5 wt. % of R, and R includes RH;

0.30-0.50 wt. % of Cu;

0.05-0.20 wt. % of Ti;

0.85-1.05 wt. % of B;

0.1-0.3 wt. % of C;

66-68 wt. % of Fe, wt. % refers to the mass percentage in the R-T-B-based permanent magnet material I;

R is a rare earth element, and the R at least includes Nd;

RH is a heavy rare earth element, and RH at least includes Tb and/or Dy.

In the present disclosure, the R-T-B-based permanent magnet material I has Cu—Ti—C grain boundary phase at the grain boundary of the magnet.

In the present disclosure, R can further comprise rare earth elements in common filed, such as Pr.

In the present disclosure, the content of R is preferably 30-32.5 wt. %, for example, 30.1 wt. %, 30.6 wt. %, 31.1 wt. %, 31.6 wt. % or 32.1 wt. %, wt. % refers to the mass percentage in the R-T-B-based permanent magnet material I.

In the present disclosure, the content of RH is preferably 0.5-1.2 wt. %, for example, 0.6 wt. %, or 1.10 wt. %, wt. % refers to the mass percentage in the R-T-B-based permanent magnet material I.

In the present disclosure, the content of Cu is preferably 0.3-0.45 wt. % or 0.5 wt. %, for example, 0.3 wt. %, or 0.35 wt. %, 0.4 wt. %, or 0.45 wt. %, wt. % refers to the mass percentage in the R-T-B-based permanent magnet material I.

In the present disclosure, the content of Ti is preferably 0.05-0.2 wt. %, for example, 0.1 wt. %, 0.15 wt. % or 0.2 wt. %, wt. % refers to the mass percentage in the R-T-B-based permanent magnet material I.

In the present disclosure, the content B is preferably 0.9-1.0 wt. %, for example, 0.9 wt. %, 0.92 wt. %, 0.94 wt. %, 0.96 wt. %, 0.98 wt. % or 1 wt. %, wt. % refers to the mass percentage in the R-T-B-based permanent magnet material I.

In the present disclosure, the content of C is preferably 0.1-0.2 wt. %, for example, 0.12 wt. %, 0.14 wt. %, 0.16 wt. % or 0.18 wt. %, wt. % refers to the mass percentage in the R-T-B-based permanent magnet material I.

In the present disclosure, the R-T-B-based permanent magnet material I preferably further comprises the following component by mass percentage: O 0-0.15 wt. %, but not 0, wt. % refers to the mass percentage in the R-T-B-based permanent magnet material I.

Wherein, the content of O is preferably 0.04-0.12 wt. %, for example, 0.05 wt. %, 0.06 wt. %, 0.08 wt. %, 0.1 wt. % or 0.12 wt. %, wt. % refers to the mass percentage in the R-T-B-based permanent magnet material I.

In the present disclosure, the R-T-B-based permanent magnet material I can further comprise the following components by mass percentage: M 0-3 wt. %, M is at least one element selected from the group consisting of Co, Al, Ga, Si, Sn, Ge, Ag, Au, Bi, Mn and Cr.

Wherein, the kind of M is preferably Co or Ga.

Wherein, when M comprises Co, the content of Co can be 0.5-1.5 wt. %, for example, 0.6 wt. %, 0.7 wt. %, 1.0 wt. % or 1.2 wt. %, wt. % refers to the mass percentage in the R-T-B-based permanent magnet material I.

Wherein, when M comprises Ca, the content of Ca can be 0.2-0.5 wt. %, for example, 0.3 wt. % or 0.4 wt. %, wt. % refers to the mass percentage in the R-T-B-based permanent magnet material I.

In a preferred embodiment of the present disclosure, the R-T-B-based permanent magnet material I comprises the following components:

30-32.5 wt. % of R, the content of RH is 0.5-1.2 wt. %;

0.3-0.45 wt. % of Cu;

0.05-0.20 wt. % of Ti;

0.9-1 wt. % of B;

0.1-0.2 wt. % of C;

0.04-0.12 wt. % of O 0.5-1.5 wt. % of Co, remainder for Fe and unavoidable impurities;

wt. % refers to the mass percentage in the R-T-B-based permanent magnet material I.

In a preferred embodiment of the present disclosure, the R-T-B-based permanent magnet material I comprises the following components:

30-32.5 wt. % of R, the content of RH is 0.5-1.2 wt. %;
0.3-0.45 wt. % of Cu;
0.05-0.20 wt. % of Ti;
0.9-1 wt. % of B;
0.1-0.2 wt. % of C;
0.04-0.12 wt. % of O;
0.5-1.5 wt. % of Co;
0.2-0.5 wt. % of Co; remainder for Fe and unavoidable impurities;
wt. % refers to the mass percentage in the R-T-B-based permanent magnet material I.

In a preferred embodiment of the present disclosure, the R-T-B-based permanent magnet material I comprises the following components: Nd is 31 wt. %, Tb is 0.6 wt. %, Cu is 0.5 wt. %, Ti is 0.05 wt. %, B is 0.86 wt. %, C is 0.1 wt. %, O is 0.05 wt. %, Co is 0.5 wt. % and Ga is 0.3 wt. %, remainder for Fe and unavoidable impurities, wt. % refers to the mass percentage in the R-T-B-based permanent magnet material I.

In a preferred embodiment of the present disclosure, the R-T-B-based permanent magnet material I comprises the following components: Nd is 30.5 wt. %, Tb is 0.6 wt. %, Cu is 0.4 wt. %, Ti is 0.15 wt. %, B is 0.9 wt. %, C is 0.14 wt. %, O is 0.08 wt. %, Co is 0.6 wt. % and Ga is 0.4 wt. %, remainder for Fe and unavoidable impurities, wt. % refers to the mass percentage in the R-T-B-based permanent magnet material I.

In a preferred embodiment of the present disclosure, the R-T-B-based permanent magnet material I comprises the following components: Nd is 31.5 wt. %, Tb is 0.6 wt. %, Cu is 0.35 wt. %, Ti is 0.1 wt. %, B is 0.92 wt. %, C is 0.16 wt. %, O is 0.1 wt. %, Co is 0.7 wt. % and Ga is 0.5 wt. %, remainder for Fe and unavoidable impurities, wt. % refers to the mass percentage in the R-T-B-based permanent magnet material I.

In a preferred embodiment of the present disclosure, the R-T-B-based permanent, magnet material I comprises the following components: Nd is 30.5 wt. %, Tb is 0.6 wt. %, Cu is 0.4 wt. %, Ti is 0.15 wt. %, B is 0.92 wt. %, C is 0.12 wt. %, O is 0.13 wt. %, Co is 1 wt. % and Ga is 0.5 wt. %, remainder for Fe and unavoidable impurities, wt. % refers to the mass percentage in the R-T-B-based permanent, magnet material I.

In a preferred embodiment of the present disclosure, the R-T-B-based permanent, magnet material I comprises the following components: PrNd is 30.5 wt. %, Tb is 0.6 wt. %, Cu is 0.4 wt. %, Ti is 0.15 wt. %, B is 0.9 wt. %, C is 0.1 wt. %, O is 0.08 wt. %, Co is 0.5 wt. % and Ga is 0.4 wt. %, remainder for Fe and unavoidable impurities, wt. % refers to the mass percentage in the R-T-B-based permanent magnet material I.

In a preferred embodiment of the present disclosure, the R-T-B-based permanent, magnet material I comprises the following components: Nd is 30.5 wt. %, Dy is 0.6 wt. %, Cu is 0.4 wt. %, Ti is 0.15 wt. %, B is 0.9 wt. %, C is 0.1 wt. %, O is 0.08 wt. %, Co is 0.5 wt. % and Ga is 0.4 wt. %, remainder for Fe and unavoidable impurities, wt. % refers to the mass percentage in the R-T-B-based permanent magnet material I.

In a preferred embodiment of the present disclosure, the R-T-B-based permanent magnet material I comprises the following components: Nd is 29.5 wt. %, Tb is 1.1 wt. %, Cu is 0.3 wt. %, Ti is 0.15 wt. %, B is 0.94 wt. %, C 0.12 wt. %, O is 0.08 wt. % and Co is 1 wt. %, remainder for Fe and unavoidable impurities, wt. % refers to the mass percentage in the R-T-B-based permanent magnet material I.

In a preferred embodiment of the present disclosure, the R-T-B-based permanent magnet material I comprises the following components: Nd is 30 wt. %, Tb is 1.1 wt. %, Cu is 0.45 wt. %, Ti is 0.2 wt. %, B is 0.96 wt. %, C is 0.18 wt. %, O is 0.06 wt. % and Co is 1 wt. %, remainder for Fe and unavoidable impurities, wt. % refers to the mass percentage in the R-T-B-based permanent magnet material I.

In a preferred embodiment of the present disclosure, the R-T-B-based permanent magnet material I comprises the following components: Nd is 29 wt. %, Tb is 1.1 wt. %, Cu is 0.5 wt. %, Ti is 0.1 wt. %, B is 0.98 wt. %, C is 0.14 wt. %, O is 0.12 wt. % and Co is 1.2 wt. %, remainder for Fe and unavoidable impurities, wt. % refers to the mass percentage in the R-T-B-based permanent magnet material I.

In a preferred embodiment of the present disclosure, the R-T-B-based permanent magnet material I comprises the following components: Nd is 29 wt. %, Tb is 1.1 wt. %, Cu is 0.4 wt. %, Ti is 0.15 wt. %, B is 1 wt. %, C is 0.2 wt. %, O is 0.15 wt. % and Co is 1 wt. %, remainder for Fe and unavoidable impurities, wt. % refers to the mass percentage in the R-T-B-based permanent magnet material I.

The present disclosure provides an R-T-B-based permanent magnet material II, which comprises the following components by mass percentage:

29.0-32 wt. % of R, and R includes RH, the content of RH is 0-0.5 wt. %;
0.30-0.50 wt. % of Cu;
0.05-0.20 wt. % of Ti;
0.1-0.3 wt. % of C;
0.85-1.05 wt. % of B;
66-68 wt. % of Fe;
R is a rare earth element, and the R comprises at least Nd;
RH is a heavy rare earth element, and the RH comprises at least Tb and/or Dy.

In the present disclosure, R can further comprise the rare earth elements in the common field, for example Pr.

In the present disclosure, the content of R is 29.5-31.5 wt. %, for example, 29.5 wt. %, 30 wt. %, 30.5 wt. %, 31 wt. % or 31.5 wt. %, wt. % refers to the mass percentage in the R-T-B-based permanent magnet material II.

In the present disclosure, the content of Cu is 0.3-0.45 wt. % or 0.5 wt. %, for example 0.3 wt. %, 0.35 wt. %, 0.4 wt. % or 0.45 wt. %, wt. % refers to the mass percentage in the R-T-B-based permanent magnet material II.

In the present disclosure, the content of Ti is 0.05-0.2 wt. %, for example, 0.1 wt. %, 0.15 wt. % or 0.2 wt. %, wt. % refers to the mass percentage in the R-T-B-based permanent, magnet material II.

In the present disclosure, the content of B is 0.9-1.0 wt. %, for example, 0.9 wt. %, 0.92 wt. %, 0.94 wt. %, 0.96 wt. %, 0.98 wt. % or 1 wt. %, wt. % refers to the mass percentage of mass in the R-T-B-based permanent magnet material II.

In the present disclosure, the content of C is 0.1-0.2 wt. %, such as 0.12 wt. %, 0.14 wt. %, 0.16 wt. % or 0.18 wt. %, wt. % refers to the mass percentage in the R-T-B-based permanent magnet material II.

In the present disclosure, the R-T-B-based permanent magnet material II can further comprise by mass percentage:

0-0.15 wt. % of O, but not 0, wt. % refers to the mass percentage in the R-T-B-based permanent magnet material II.

Wherein, the content of O is preferably 0.04-0.12 wt. %, such as 0.05 wt. %, 0.06 wt. %, 0.08 wt. %, 0.1 wt. % or 0.12 wt. %, wt. % refers to the mass percentage in the R-T-B-based permanent magnet material II.

In the present disclosure, the R-T-B-based permanent magnet material II can further comprise by mass percentage: 0-3 wt. % of M, and the M comprises at least one element in the group consisting of Co, Al, Ga, Si, Sn, Ge, Ag, Au, Bi, Mn and Cr.

When the M comprises Co, the content of Co is preferably 0.5-1.5 wt. %, such as 0.6 wt. %, 0.7 wt. %, 1.0 wt. % or 1.2 wt. %, wt. % refers to the mass percentage in the R-T-B-based permanent magnet material II.

When the M comprises Ga, the content of Ga is preferably 0.2-0.5 wt. %, for example 0.3 wt. % or 0.4 wt. %, wt. % refers to the mass percentage in the R-T-B-based permanent magnet material II.

In a preferred embodiment of the present disclosure, the R-T-B-based permanent magnet material II comprises the following components:

29.5-31.5 wt. % of R, and R comprises RH, the content RH is 0-0.5 wt. %;

0.30-0.45 wt. % of Cu;

0.05-0.2 wt. % of Ti;

0.9-1 wt. % of B;

0.1-0.2 wt. % of C;

R is a rare earth element, and the R comprises at least Nd;

RH is a heavy rare earth element, the RH comprises at least Tb or Dy; remainder for Fe and unavoidable impurities.

In a preferred embodiment of the present disclosure, the R-T-B-based permanent magnet material II comprises the following components: Nd is 31 wt. %, Cu is 0.5 wt. %, Ti is 0.05 wt. %, B is 0.86 wt. %, C is 0.1 wt. %, O is 0.05 wt. %, Co is 0.5 wt. % and Ga is 0.3 wt. %, remainder for Fe and unavoidable impurities, wt. % refers to the mass percentage in the R-T-B-based permanent magnet material II.

In a preferred embodiment of the present disclosure, the R-T-B-based permanent magnet material II comprises the following components: Nd is 30.5 wt. %, Cu is 0.4 wt. %, Ti is 0.15 wt. %, B is 0.9 wt. %, C is 0.14 wt. %, O is 0.08 wt. %, Co is 0.6 wt. % and Ga is 0.4 wt. %, remainder for Fe and unavoidable impurities, wt. % refers to the mass percentage in the R-T-B-based permanent magnet material II.

In a preferred embodiment of the present disclosure, the R-T-B-based permanent magnet material I comprises the following components: Nd is 31.5 wt. %, Cu is 0.35 wt. %, Ti is 0.1 wt. %, B is 0.92 wt. %, C is 0.16 wt. %, O is 0.1 wt. %, Co is 0.7 wt. % and Ga is 0.5 wt. %, remainder for Fe and unavoidable impurities, wt. % refers to the mass percentage in the R-T-B-based permanent magnet material II.

In a preferred embodiment of the present disclosure, the R-T-B-based permanent magnet material II comprises the following components: Nd is 30.5 wt. %, Cu is 0.4 wt. %, Ti is 0.15 wt. %, B is 0.92 wt. %, C is 0.12 wt. %, O is 0.13 wt. %, Co is 1 wt. % and Ga is 0.5 wt. %, remainder for Fe and unavoidable impurities, wt. % refers to the mass percentage in the R-T-B-based permanent magnet material II.

In a preferred embodiment of the present disclosure, the R-T-B-based permanent magnet material II comprises the following components: PrNd is 30.5 wt. %, Cu is 0.4 wt. %, Ti is 0.15 wt. %, B is 0.9 wt. %, C is 0.1 wt. %, O is 0.08 wt. %, Co is 0.5 wt. % and Ga is 0.4 wt. %, remainder for Fe and unavoidable impurities, wt. % refers to the mass percentage in the R-T-B-based permanent magnet material II.

In a preferred embodiment of the present disclosure, the R-T-B-based permanent magnet material II comprises the following components: Nd is 30.5 wt. %, Cu is 0.4 wt. %, Ti is 0.15 wt. %, B is 0.9 wt. %, C is 0.1 wt. %, O is 0.08 wt. %, Co is 0.5 wt. % and Ga is 0.4 wt. %, remainder for Fe and unavoidable impurities, wt. % refers to the mass percentage in the R-T-B-based permanent magnet material II.

In a preferred embodiment of the present disclosure, the R-T-B-based permanent magnet material II comprises the following components: Nd is 29.5 wt. %, Tb is 0.5 wt. %, Cu is 0.3 wt. %, Ti is 0.15 wt. %, B is 0.94 wt. %, C is 0.12 wt. %, O is 0.08 wt. % and Co is 1 wt. %, remainder for Fe and unavoidable impurities, wt. % refers to the mass percentage in the R-T-B-based permanent magnet material II.

In a preferred embodiment of the present disclosure, the R-T-B-based permanent magnet material II comprises the following components: Nd is 30 wt. %, Tb is 0.5 wt. %, Cu is 0.45 wt. %, Ti is 0.2 wt. %, B is 0.96 wt. %, C is 0.18 wt. %, O is 0.06 wt. % and Co is 1 wt. %, remainder for and unavoidable impurities, wt. % refers to the mass percentage in the R-T-B-based permanent magnet material II.

In a preferred embodiment of the present disclosure, the R-T-B-based permanent magnet material II comprises the following components: Nd is 29 wt. %, Tb is 0.5 wt. %, Cu is 0.5 wt. %, Ti is 0.1 wt. %, B is 0.98 wt. %, C is 0.14 wt. %, O is 0.12 wt. % and Co is 1.2 wt. %, remainder for Fe and unavoidable impurities, wt. % refers to the mass percentage in the R-T-B-based permanent magnet material II.

In a preferred embodiment of the present disclosure, the R-T-B-based permanent magnet material II comprises the following components: Nd is 29 wt. %, Tb is 0.5 wt. %, Cu is 0.4 wt. %, Ti is 0.15 wt. %, B is 1 wt. %, C is 0.2 wt. %, O is 0.15 wt. % and Co is 1 wt. %, remainder for Fe and unavoidable impurities, wt. % refers to the mass percentage in the R-T-B-based permanent magnet material II.

The present disclosure further provides a preparation method for R-T-B-based permanent magnet material II, wherein, the preparation method comprises the following steps: the molten liquid of the raw material composition of the R-T-B-based permanent magnet material II is subjected to casting, decrepitation, pulverization, forming and sintering;

The raw material composition of the R-T-B-based permanent magnet material II comprises the following components by mass percentage: 29.0-32 wt. % of R, and R comprises RH, the content of RH is 0-0.5 wt. %; 0.30-0.50 wt. % of Cu; 0.05-0.20 wt. % of Ti; 0.85-1.05 wt. % of B; 66-68 wt. % of Fe; R is a rare earth element, and the R comprises at least Nd; RH is a heavy rare earth element, the RH comprises at least Tb or Dy.

Wherein, R can further comprise rare earth elements in the common filed, for example Pr.

Wherein, the content of R is preferably 29.5-31.5 wt. %, such as 29.5 wt. %, 30 wt. %, 30.5 wt. %, 31 wt. % or 31.5 wt. %, wt. % refers to the mass percentage in the raw material composition of the R-T-B-based permanent magnet material II.

Wherein, the content of Cu is preferably 0.3-0.45 wt. % or 0.5 wt. %, such as 0.3 wt. %, 0.35 wt. %, 0.4 wt. % or 0.45 wt. %, wt. % refers to the mass percentage in the raw material composition of the R-T-B-based permanent magnet material II.

Wherein, the content of Ti is preferably 0.05-0.2 wt. %, such as 0.1 wt. %, 0.15 wt. % or 0.2 wt. %, wt. % refers to the mass percentage in the raw material composition of the R-T-B-based permanent magnet material II.

Wherein, the content of B is preferably 0.9-1 wt. %, such as 0.9 wt. %, 0.92 wt. %, 0.94 wt. %, 0.96 wt. %, 0.98 wt. % or 1 wt. %, wt. % refers to the mass percentage in the raw material composition of the R-T-B-based permanent magnet material II.

Wherein, the content of C is preferably 0.1-0.2 wt. %, such as 0.12 wt. %, 0.14 wt. %, 0.16 wt. % or 0.18 wt. %, wt. % refers to the mass percentage in the raw material composition of the R-T-B-based permanent magnet material II.

Wherein, the R-T-B-based permanent magnet material II can further comprise the following components by mass percentage: 0-3 wt % of M, and the comprises at least one element in the group consisting of Co, Al, Ga, Si, Sn, Ge, Ag, Au, Bi, Mn and Cr, wt. % refers to the mass percentage in the raw material composition of the R-T-B-based permanent magnet material II.

When the M comprises Co, the content of Co is preferably 0.5-1.5 wt. %, such as 0.6 wt. %, 0.7 wt. %, 1.0 wt. % or 1.2 wt. %, wt. % refers to the mass percentage in the R-T-B-based permanent magnet material II.

When the M comprises Ga, the content of Ga is preferably 0.2-0.5 wt. %, for example 0.3 wt. % or 0.4 wt. %, wt. % refers to the mass percentage in the R-T-B-based permanent magnet material II.

In the present disclosure, the molten liquid of the raw material composition of the R-T-B-based permanent magnet material II can be obtained by conventional methods in this field, for example, melting in a high frequency vacuum induction melting furnace. The vacuum degree of the melting furnace can be $5\times10^{-2}$ Pa. The melting temperature can be 1500° C. or less.

In the present disclosure, the casting process can be the conventional casting process in this field, for example, cooling at a rate of $10^{2}$° C./s to $10^{4}$° C./s in an Ar atmosphere (for example, in an Ar atmosphere of $5.5\times10^{4}$ Pa).

In the present disclosure, the process of decrepitation can be the conventional decrepitation process in this field, for example, being subjected to hydrogen absorption, dehydrogenation and cooling treatment.

Wherein, the hydrogen absorption can be carried out at the hydrogen pressure of 0.15 MPa.

Wherein, the dehydrogenation can be carried out under the condition of both vacuum-pumping and heating.

In the present disclosure, the process of pulverization can be the conventional pulverization process in this field, such as jet mill pulverization.

Wherein, preferably, the process of pulverization is carried out in an atmosphere with an oxidizing gas content of 100 ppm or less.

The oxidizing gas refers to the oxygen or moisture content.

Wherein, the pressure in the pulverization chamber of the jet mill pulverization can be 0.38 MPa.

Wherein, the time of the jet mill pulverization can be 3 hours.

Wherein, after pulverization, the lubricant can be conventionally added in this field, such as zinc stearate. The addition amount of the lubricant can be 0.10-0.15% by weight of the mixed powder, for example, 0.12%.

In the present disclosure, the forming process can be a conventional forming process in this field, such as magnetic field forming method or hot pressing and hot deformation method.

In the present disclosure, the sintering process can be the conventional sintering process in this field, for example, under the vacuum condition (for example, under the vacuum of $5\times10^{-3}$ Pa), being subjected to preheating, sintering, cooling.

Wherein, the temperature of the preheating can be 300-600° C. The time of the preheating can be 1-2 h. Preferably, the preheating is preheating at 300° C. and 600° C. for 1 h respectively.

Wherein, the temperature of the sintering can be the conventional sintering temperature in this field, such as 900-1100° C., and then 1040° C.

Wherein, the time of the sintering can be the conventional sintering time in this field, such as 2 h.

Wherein, the Ar can be introduced to make the air pressure reach 0.1 MPa before cooling.

The present disclosure also provides an R-T-B-based permanent magnet material II prepared by the above method.

The present disclosure also provides a preparation method for R-T-B-based permanent magnet material I, wherein, the R-T-B-based permanent magnet material II is subjected to the grain boundary diffusion treatment;

the heavy rare earth elements in the grain boundary diffusion treatment include Tb and/or Dy.

In the present disclosure, the grain boundary diffusion treatment can be treated according to the conventional process in this field, for example, attaching substance containing Tb and/or substance containing Dy to the surface of the R-T-B-based permanent magnet material by evaporating, coating or sputtering, then carrying out diffusion heat treatment.

Wherein, the substance containing Tb or Dy may be Tb metal or Dy metal, a Tb-containing or Dy-containing compound or an alloy.

Wherein, the temperature of the diffusion heat treatment is preferably 800-900° C., such as 850° C.

Wherein, the time of the diffusion heat treatment is preferably 12-48 h, such as 24 h.

Wherein, after the grain boundary diffusion treatment, heat treatment can also be carried out. The temperature of the heat treatment is 450-550° C., for example 500° C. The time of the heat treatment is 3 h, The present disclosure also provides an R-T-B-based permanent magnet material I prepared by the above method.

The present disclosure also provides a use of the R-T-B-based permanent magnet material as electronic components.

Wherein, the electronic components can be conventional electronic components in the field, such as electronic components in a motor.

Wherein, the R-T-B-based permanent magnet material can be the R-T-B-based permanent magnet material I and/or the R-T-B-based permanent magnet material II.

The reagents and raw materials used in the present disclosure are commercially available.

The positive progressive effect of the present disclosure is as follows:

(1) The R-T-B-based permanent magnet material I in the present disclosure contains Cu—Ti—C grain boundary phase, which allows the higher content of carbon, and does not need to control the content of carbon additionally, which is conducive for production control.

(2) The grain boundary phase of Cu—Ti—C is formed in the diffusion process, which inhibits the generation of Nd—C, and provides more diffusion channels at the same time, contributing to the promotion of Hcj in the diffusion process: Hcj can be increased by 1162 kA/m through Tb diffusion and Hcj can be increased by 883 kA/m through Dy diffusion in the preferred embodiments.

DETAILED DESCRIPTION OF THE PREFERRED EMBODIMENT

Figure 1:
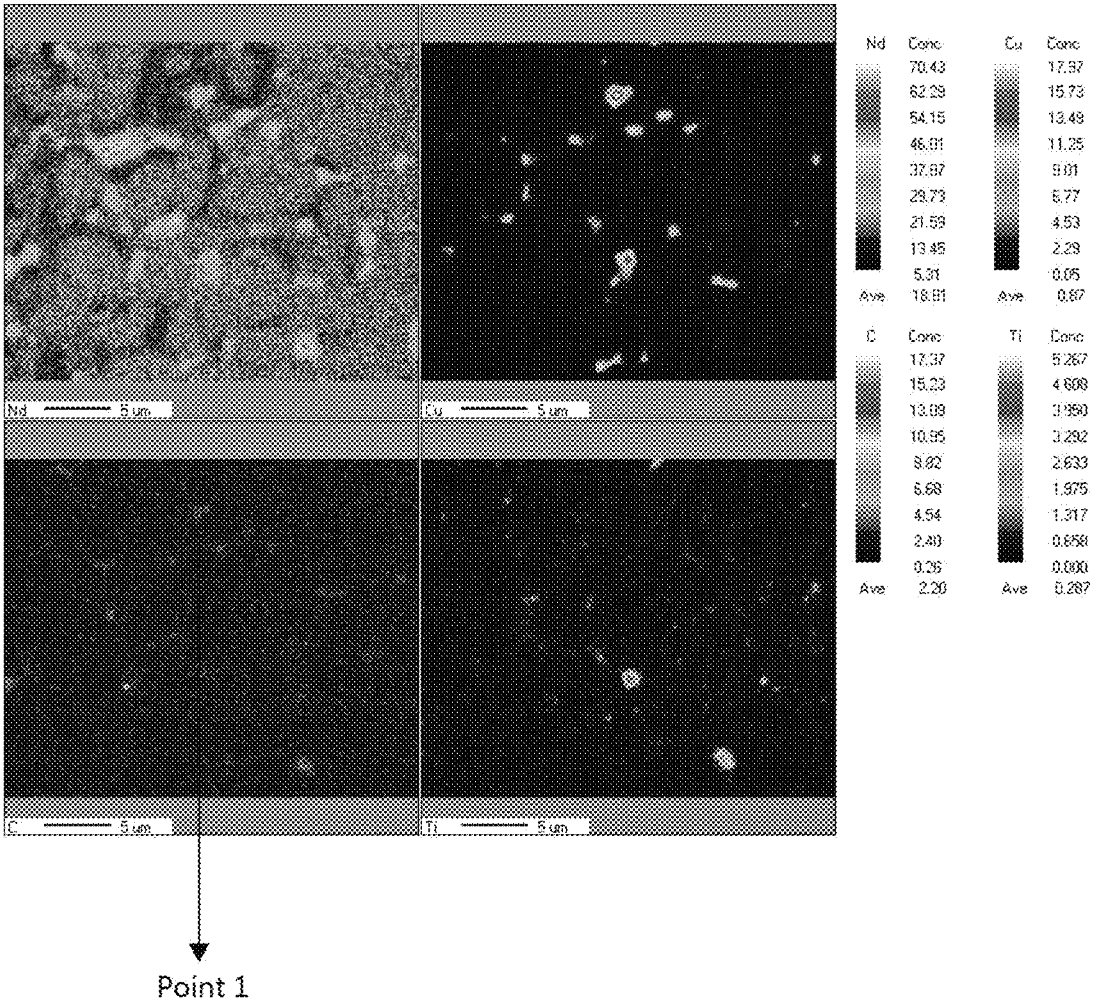
FIG. 1 is the distribution diagram of Nd, Cu, Ti and C formed by FE-EPMA face scanning of R-T-B-based permanent magnet materials prepared in Embodiment 2, wherein, the point 1 is the Cu—Ti—C phase.

The following embodiments further illustrate the present disclosure, but the present disclosure is not limited thereto. Experimental methods for which specific conditions are not specified in the following embodiments shall be selected in accordance with conventional methods and conditions, or in accordance with the commodity description. In the following table, wt. % refers to the mass percentage of the component in the raw material composition of the neodymium-iron-boron magnet material, and "/" means that the element is not added. "Br" refers to remanence, and "Hcj" refers to intrinsic coercivity.

The formulas of R-T-B-based permanent magnet material II of the embodiments and comparative embodiments are shown in Table 1.

TABLE 1

Components and content of the raw material composition of R-T-B-based permanent magnet material II (wt. %)

| No. | R | Nd | Pr Nd | Tb | Dy | Cu | Ti | B | Co | Ga | Fe |
|---|---|---|---|---|---|---|---|---|---|---|---|
| Embodiment 1 | 31.0 | 31.0 | / | / | / | 0.50 | 0.05 | 0.86 | 0.50 | 0.30 | remainder |
| Embodiment 2 | 30.5 | 30.5 | / | / | / | 0.40 | 0.15 | 0.90 | 0.60 | 0.40 | remainder |
| Embodiment 3 | 31.5 | 31.5 | / | / | / | 0.35 | 0.10 | 0.92 | 0.70 | 0.50 | remainder |
| Embodiment 4 | 30.5 | 30.5 | / | / | / | 0.40 | 0.15 | 0.92 | 1.00 | 0.50 | remainder |
| Embodiment 5 | 30.5 | / | / | / | / | 0.40 | 0.15 | 0.90 | 0.50 | 0.40 | remainder |
| Embodiment 6 | 30.5 | 30.5 | 30.5 | / | / | 0.40 | 0.15 | 0.90 | 0.50 | 0.40 | remainder |
| Embodiment 7 | 30.0 | 29.0 | / | / | 0.5 | 0.30 | 0.15 | 0.94 | 1.00 | / | remainder |
| Embodiment 8 | 30.5 | 30.0 | / | / | 0.5 | 0.45 | 0.20 | 0.96 | 1.00 | / | remainder |
| Embodiment 9 | 29.5 | 29.0 | / | / | 0.5 | 0.50 | 0.15 | 0.98 | 1.00 | / | remainder |
| Embodiment 10 | 29.5 | 29.0 | / | / | 0.5 | 0.40 | 0.15 | 1.00 | 1.20 | / | remainder |
| Comparative Embodiment 1 | 30.5 | 30.5 | / | / | / | 0.60 | 0.15 | 0.90 | 0.60 | 0.40 | remainder |
| Comparative Embodiment 2 | 30.5 | 30.5 | / | / | / | 0.20 | 0.20 | 0.92 | 0.60 | 0.40 | remainder |
| Comparative Embodiment 3 | 29.5 | 29.0 | / | 0.5 | / | 0.45 | 0.02 | 0.95 | 1.20 | / | remainder |
| Comparative Embodiment 4 | 29.5 | 29.0 | / | 0.5 | / | 0.30 | 0.30 | 1.00 | 1.20 | / | remainder |
| Comparative Embodiment 5 | 30.0 | 29.5 | / | 0.5 | / | 0.40 | 0.10 | 0.95 | 1.00 | / | remainder |
| Comparative Embodiment 6 | 30.0 | 29.5 | / | 0.5 | / | 0.40 | 0.10 | 0.95 | 1.00 | / | remainder |
| Comparative Embodiment 7 | 30.5 | 30.5 | / | / | / | 0.60 | 0.10 | 0.92 | 0.50 | 0.50 | remainder |
| Comparative Embodiment 8 | 30.0 | 29.5 | / | 0.5 | / | 0.40 | 0.25 | 0.95 | 1.00 | / | remainder |
| Comparative Embodiment 9 | 30.0 | 29.5 | / | 0.5 | / | 0.020 | 0.25 | 0.95 | 1.00 | / | remainder |
| Comparative Embodiment 10 | 30.5 | 30.5 | / | / | / | 0.60 | 0.25 | 0.90 | 0.50 | 0.40 | remainder |

TABLE 2

Components and content of R-T-B-based permanent magnet material II (wt. %)

| No. | R | Nd | Pr Nd | Tb | Dy | Cu | Ti | B | O | Co | Ga | Fe |
|---|---|---|---|---|---|---|---|---|---|---|---|---|
| Embodiment 1 | 31.0 | 31.0 | / | / | / | 0.50 | 0.05 | 0.86 | 0.05 | 0.50 | 0.30 | remainder |
| Embodiment 2 | 30.5 | 30.5 | / | / | / | 0.40 | 0.15 | 0.90 | 0.08 | 0.60 | 0.40 | remainder |
| Embodiment 3 | 31.5 | 31.5 | / | / | / | 0.35 | 0.10 | 0.92 | 0.10 | 0.70 | 0.50 | remainder |
| Embodiment 4 | 30.5 | 30.5 | / | / | / | 0.40 | 0.15 | 0.92 | 0.13 | 1.00 | 0.50 | remainder |
| Embodiment 5 | 30.5 | / | 30.5 | / | / | 0.40 | 0.15 | 0.90 | 0.08 | 0.50 | 0.40 | remainder |
| Embodiment 6 | 30.5 | 30.5 | / | / | / | 0.40 | 0.15 | 0.90 | 0.08 | 0.50 | 0.40 | remainder |
| Embodiment 7 | 30.0 | 29.5 | / | 0.5 | / | 0.30 | 0.15 | 0.94 | 0.08 | 1.00 | / | remainder |
| Embodiment 8 | 30.5 | 30.0 | / | 0.5 | / | 0.45 | 0.20 | 0.96 | 0.06 | 1.00 | / | remainder |
| Embodiment 9 | 29.5 | 29.0 | / | 0.5 | / | 0.50 | 0.10 | 0.98 | 0.12 | 1.20 | / | remainder |
| Embodiment 10 | 29.5 | 29.0 | / | 0.5 | / | 0.40 | 0.15 | 1.00 | 0.15 | 1.00 | / | remainder |
| Comparative Embodiment 1 | 30.5 | 30.5 | / | / | / | 0.60 | 0.15 | 0.90 | 0.10 | 0.60 | 0.40 | remainder |

TABLE 2-continued

| Components and content of R-T-B-based permanent magnet material II (wt. %) | | | | | | | | | | | | |
|---|---|---|---|---|---|---|---|---|---|---|---|---|
| No. | R | Nd | Pr Nd | Tb | Dy | Cu | Ti | B | O | Co | Ga | Fe |
| Comparative Embodiment 2 | 30.5 | 30.5 | / | / | / | 0.20 | 0.20 | 0.92 | 0.10 | 0.60 | 0.40 | remainder |
| Comparative Embodiment 3 | 29.5 | 29.0 | / | 0.5 | / | 0.45 | 0.02 | 0.95 | 0.10 | 1.20 | / | remainder |
| Comparative Embodiment 4 | 29.5 | 29.0 | / | 0.5 | / | 0.30 | 0.30 | 1.00 | 0.10 | 1.20 | / | remainder |
| Comparative Embodiment 5 | 30.0 | 29.5 | / | 0.5 | / | 0.40 | 0.10 | 0.95 | 0.10 | 1.00 | / | remainder |
| Comparative Embodiment 6 | 30.0 | 29.5 | / | 0.5 | / | 0.40 | 0.10 | 0.95 | 0.10 | 1.00 | / | remainder |
| Comparative Embodiment 7 | 30.5 | 30.5 | / | / | / | 0.60 | 0.10 | 0.92 | 0.10 | 0.50 | 0.50 | remainder |
| Comparative Embodiment 8 | 30.0 | 29.5 | / | 0.5 | / | 0.40 | 0.25 | 0.95 | 0.10 | 1.00 | / | remainder |
| Comparative Embodiment 9 | 30.0 | 29.5 | / | 0.5 | / | 0.20 | 0.25 | 0.95 | 0.10 | 1.00 | / | remainder |
| Comparative Embodiment 10 | 30.5 | 30.5 | / | / | / | 0.60 | 0.25 | 0.90 | 0.10 | 0.50 | 0.40 | remainder |

The preparation method for the R-T-B-based permanent magnet material in Embodiments 1-5 and 7-10, and Comparative Embodiments 1-9 is as follows:

(1) Melting process: according to the formulas shown in Table 1, the pre-made raw materials were put into the crucible made of aluminum oxide, and were vacuum melted in the high frequency vacuum induction melting furnace and in a vacuum of $5\times10^{-2}$ Pa at a temperature of 1500° C. or less.

(2) Casting process: Ar gas was introduced into the melting furnace after vacuum melting to make the air pressure reach 55,000 Pa, and then casting was carried out, and quenching alloy was obtained at the cooling rate of $10^{2}$° C./s to $10^{4}$° C./s.

(3) Hydrogen decrepitation process: the hydrogen decrepitation furnace with quench alloy placed therein was vacuumed at room temperature, and then hydrogen with a purity of 99.9% was introduced into the hydrogen decrepitation furnace, to maintain the hydrogen pressure at 0.15 MPa; after full hydrogen absorption, the temperature was raised while vacuuming for full dehydrogenation; then cooled, and took out the powder obtained from hydrogen decrepitation.

(4) Micro-pulverization process: In nitrogen atmosphere with the content of oxidizing gas of 100 ppm or less and under the condition of a pressure of 0.38 MPa in the pulverization chamber, the powder obtained from hydrogen decrepitation was pulverized by jet mill pulverization for 3 hours to obtain fine powder. The oxidizing gas refers to oxygen or water.

(5) The zinc stearate was added to the powder obtained from jet mill pulverization, the addition amount of zinc stearate was 0.12% by weight of mixed powder, and then mixed fully by v-type mixer.

(6) Magnetic field forming process: The rectangular oriented magnetic field forming machine was used to form the above powder with zinc stearate into a cube with sides of 25 mm in a oriented magnetic field of 1.6 T and under the molding pressure of 0.35 ton/cm$^2$; demagnetization was carried out in a magnetic field of 0.2 T after forming. In order to prevent the formed body after the first forming from contacting the air, it was sealed, and then the secondary forming was carried out with the secondary forming machine (isostatic pressing machine) under the pressure of 1.3 ton/cm$^2$.

(7) Sintering process: each formed body was moved to the sintering furnace for sintering, sintered in the vacuum of $5\times10^{-3}$ Pa and at 300° C. and 600° C. for 1 hour respectively; then sintered at the temperature of 1050° C. for 2 hours; Ar was then introduced to make the air pressure reach 0.1 MPa and then cooled to room temperature, to obtain the R-T-B-based permanent magnet material II.

(8) Grain boundary diffusion treatment process: The sintered body was processed into the magnet with a diameter of 20 mm, and a thickness of 3 mm, the direction of the thickness was the direction of magnetic field orientation, after the surface was cleaned, the raw material prepared with Tb fluoride was coated on the magnet through fully spraying respectively, after drying the coated magnet, the metal attached with Dy was sputtered on the surface of the magnet in the high purity Ar atmosphere, and diffusing heat treatment was carried out at 850° C. for 24 hours. Cooled to room temperature.

(9) Heat treatment process: The sintered body was heated at 500° C. for 3 hours in the Ar of high purity, cooled to room temperature and taken out to obtain the R-T-B-based permanent magnet material I.

The preparation method for R-T-B-based permanent magnet materials in Embodiment 6 and Comparative Embodiment 10 is as follows:

The R-T-B-based permanent magnet materials in Embodiment 6 and Comparative embodiment 10 were prepared, according to the formulas as shown in Table 1, and the preparation process in Embodiment 1, the difference is: the metal attached with Dy was sputtered on the surface of the magnet in the process of grain boundary diffusion.

Effect Embodiment

The magnetic properties and components of RTB-based permanent magnet materials prepared in Embodiments 1-10 and Comparative embodiments 1-10 were determined respectively, which include the permanent magnetic materials before grain boundary diffusion (R-T-B-based permanent magnet material II) and the permanent magnetic materials after grain boundary diffusion (R-T-B-based permanent magnet material I), and the crystal phase structure of the magnets was observed by FE-EPMA.

(1) Evaluation of magnetic properties: The NIM-10000H BH bulk rare earth permanent magnetic nondestructive measurement system in National Institute of Metrology, China was used for magnetic properties detection of permanent magnetic materials. The detection results of magnetic properties are shown in Table 3 below.

TABLE 3

Detection results of magnetic properties

| No. | R-T-B-based permanent magnet material II Br(T) | R-T-B-based permanent magnet material II Hcj (kA/m) | R-T-B-based permanent magnet material I Br(T) | R-T-B-based permanent magnet material I Hjc (kA/m) | ΔHcj (kA/m) |
|---|---|---|---|---|---|
| Embodiment 1 | 1.421 | 860 | 1.412 | 1966 | 1106 |
| Embodiment 2 | 1.429 | 852 | 1.415 | 2006 | 1154 |
| Embodiment 3 | 1.437 | 820 | 1.423 | 1982 | 1162 |
| Embodiment 4 | 1.430 | 860 | 1.424 | 1942 | 1083 |
| Embodiment 5 | 1.420 | 884 | 1.413 | 1966 | 1083 |
| Embodiment 6 | 1.428 | 892 | 1.417 | 1775 | 884 |
| Embodiment 7 | 1.450 | 931 | 1.438 | 2086 | 1154 |
| Embodiment 8 | 1.441 | 947 | 1.432 | 2078 | 1130 |
| Embodiment 9 | 1.442 | 955 | 1.431 | 2101 | 1146 |
| Embodiment 10 | 1.438 | 931 | 1.429 | 1918 | 987 |
| Comparative Embodiment 1 | 1.404 | 852 | 1.390 | 1508 | 656 |
| Comparative Embodiment 2 | 1.435 | 844 | 1.422 | 1506 | 662 |
| Comparative Embodiment 3 | 1.435 | 939 | 1.426 | 1592 | 653 |
| Comparative Embodiment 4 | 1.434 | 931 | 1.421 | 1576 | 645 |
| Comparative Embodiment 5 | 1.433 | 923 | 1.421 | 1588 | 665 |
| Comparative Embodiment 6 | 1.450 | 1122 | 1.440 | 1910 | 788 |
| Comparative Embodiment 7 | 1.403 | 836 | 1.392 | 1493 | 657 |
| Comparative Embodiment 8 | 1.440 | 1051 | 1.429 | 1839 | 788 |
| Comparative Embodiment 9 | 1.425 | 876 | 1.413 | 1520 | 645 |
| Comparative Embodiment 10 | 1.405 | 844 | 1.391 | 1329 | 486 |

Table 3 shows that:

1) The R-T-B-based permanent magnet materials in this application have excellent performance, with Br$\geq$1.4 T and Hcj increased from $\geq$820 kA/m before diffusion to $\geq$1775 kA/m after diffusion, realizing double improvement of Hcj (Embodiments 1-10);

2) Cu—Ti—C phase cannot be formed or the proportion of the formed Cu—Ti—C phase was very little if the amounts of Cu, Ti and C in raw materials were changed on the basis of the formulas of this application, and the performance of R-T-B-based permanent magnet materials decreased significantly (Comparative Embodiments 1-10);

3) During the process of research the inventor found that, the higher content of O added was not conducive to the formation of Cu—Ti—C phase, and the magnetic properties tended to decrease (Embodiments 10).

(2) Component determination: The components of R-T-B-based permanent magnet material I were determined by the high frequency inductively coupled plasma emission spectrometer (ICP-OES). Table 4 below shows the test results of the components.

TABLE 4

Components and content of R-T-B-based permanent magnet material I

| No. | R | Nd | PrNd | Tb | Dy | Cu | Ti | B | C | 0 | Co | C3a | Fe |
|---|---|---|---|---|---|---|---|---|---|---|---|---|---|
| Embodiment 1 | 31.6 | 31.0 | / | 0.6 | / | 0.50 | 0.05 | 0.86 | 0.10 | 0.05 | 0.50 | 0.30 | remainder |
| Embodiment 2 | 31.1 | 30.5 | / | 0.6 | / | 0.40 | 0.15 | 0.90 | 0.14 | 0.08 | 0.60 | 0.40 | remainder |
| Embodiment 3 | 32.1 | 31.5 | / | 0.6 | / | 0.35 | 0.10 | 0.92 | 0.16 | 0.10 | 0.70 | 0.50 | remainder |
| Embodiment 4 | 31.1 | 30.5 | / | 0.6 | / | 0.40 | 0.15 | 0.92 | 0.12 | 0.13 | 1.00 | 0.50 | remainder |
| Embodiment 5 | 31.1 | / | 30.5 | 0.6 | / | 0.40 | 0.15 | 0.90 | 0.10 | 0.08 | 0.50 | 0.40 | remainder |
| Embodiment 6 | 31.1 | 30.5 | / | / | 0.6 | 0.40 | 0.15 | 0.90 | 0.10 | 0.08 | 0.50 | 0.40 | remainder |
| Embodiment 7 | 30.6 | 29.5 | / | 1.1 | / | 0.30 | 0.15 | 0.94 | 0.12 | 0.08 | 1.00 | / | remainder |
| Embodiment 8 | 31.1 | 30.0 | / | 1.1 | / | 0.45 | 0.20 | 0.96 | 0.18 | 0.06 | 1.00 | / | remainder |
| Embodiment 9 | 30.1 | 29.0 | / | 1.1 | / | 0.50 | 0.10 | 0.98 | 0.14 | 0.12 | 1.20 | / | remainder |
| Embodiment 10 | 30.1 | 29.0 | / | 1.1 | / | 0.40 | 0.15 | 1.00 | 0.20 | 0.15 | 1.00 | / | remainder |
| Comparative Embodiment 1 | 31.1 | 30.5 | / | 0.6 | / | 0.60 | 0.15 | 0.90 | 0.20 | 0.10 | 0.60 | 0.40 | remainder |
| Comparative Embodiment 2 | 31.1 | 30.5 | / | 0.6 | / | 0.20 | 0.20 | 0.92 | 0.15 | 0.10 | 0.60 | 0.40 | remainder |
| Comparative Embodiment 3 | 30.1 | 29.0 | / | 1.1 | / | 0.45 | 0.02 | 0.95 | 0.10 | 0.10 | 1.20 | / | remainder |
| Comparative Embodiment 4 | 30.1 | 29.0 | / | 1.1 | / | 0.30 | 0.30 | 1.00 | 0.10 | 0.10 | 1.20 | / | remainder |
| Comparative Embodiment 5 | 30.6 | 29.5 | / | 1.1 | / | 0.40 | 0.10 | 0.95 | 0.10 | 0.10 | 1.00 | / | remainder |
| Comparative Embodiment 6 | 30.6 | 29.5 | / | 1.1 | / | 0.40 | 0.10 | 0.95 | 0.10 | 0.10 | 1.00 | / | remainder |
| Comparative Embodiment 7 | 31.1 | 30.5 | / | 0.6 | / | 0.60 | 0.10 | 0.92 | 0.10 | 0.10 | 0.50 | 0.50 | remainder |
| Comparative Embodiment 8 | 30.6 | 29.5 | / | 1.1 | / | 0.40 | 0.25 | 0.95 | 0.10 | 0.10 | 1.00 | / | remainder |
| Comparative Embodiment 9 | 30.6 | 29.5 | / | 1.1 | / | 0.20 | 0.25 | 0.95 | 0.10 | 0.10 | 1.00 | / | remainder |

TABLE 4-continued

| Components and content of R-T-B-based permanent magnet material I | | | | | | | | | | | | |
|---|---|---|---|---|---|---|---|---|---|---|---|---|
| No. | R | Nd | PrNd | Tb | Dy | Cu | Ti | B | C | 0 | Co | C3a | Fe |
| Comparative Embodiment 10 | 31.1 | 30.5 | / | / | 0.6 | 0.60 | 0.25 | 0.90 | 0.10 | 0.10 | 0.50 | 0.40 | remainder |

Figure 2:
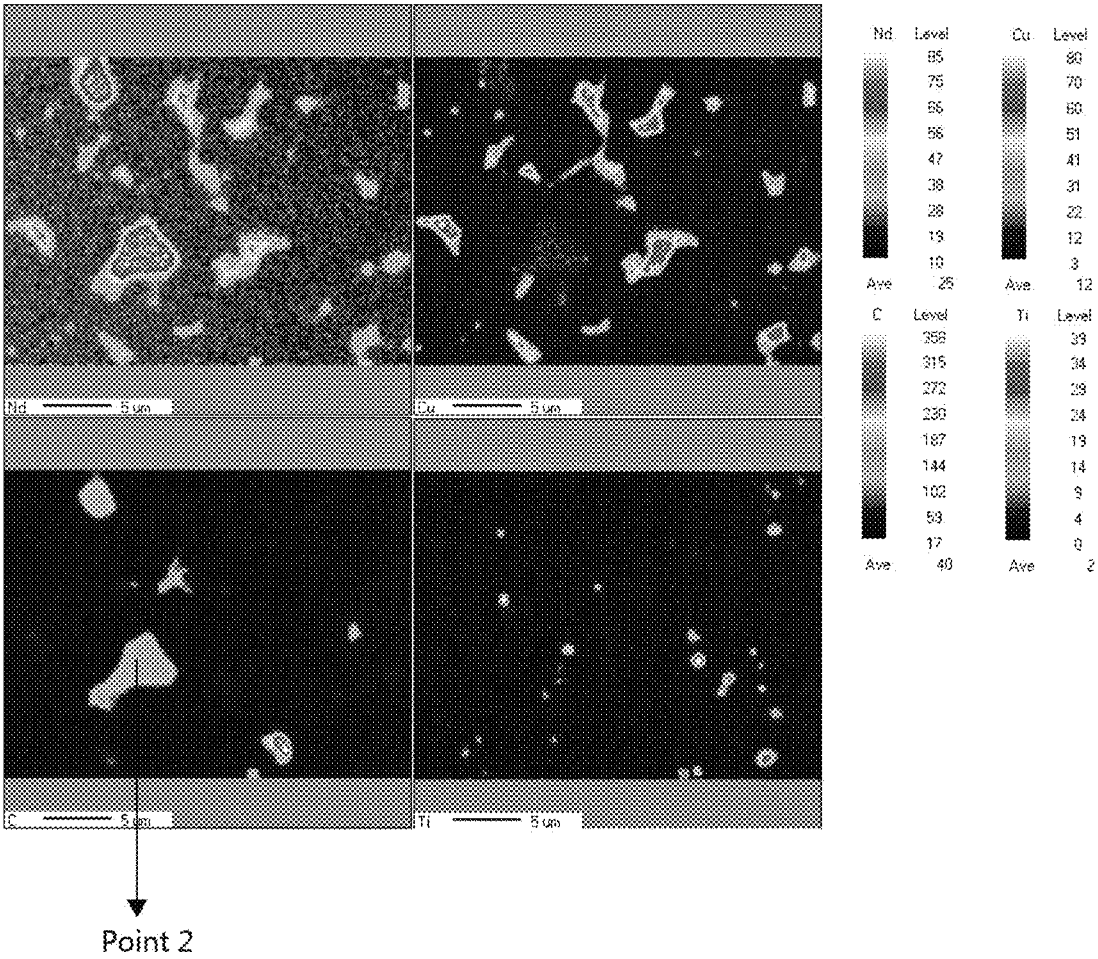
FIG. 2 is the distribution diagram of Nd, Cu, Ti and C formed by FE-EPMA face scanning of R-T-B-based permanent magnet materials prepared in Comparative embodiment 2.

(3) FE-EPMA detection: The vertical orientation surface of the permanent magnet material was polished, and detected using the Field emission electron probe micro-analyzer (FE-EPMA) (JEOL, 8530F). The R-T-B-based permanent magnet material I in Embodiment 2 and Comparative. Embodiment 2 were detected by FE-EPMA, there is a grain boundary phase at the corresponding point 1 in FIG. 1 at the grain boundary of the R-T-B-based permanent magnet material I in Embodiment 2; there is a grain boundary phase at the corresponding point 2 in FIG. 2 at the grain boundary of the R-T-B-based permanent magnet material I in Comparative Embodiment 2.

What is claimed is:

1. An R-T-B-based permanent magnet material I, wherein, the R-T-B-based permanent magnet material I consists of the following components by mass percentage:

29.0-32.5 wt. % of R;

0.30-0.50 wt. % of Cu;

0.05-0.20 wt. % of Ti;

0.85-1.05 wt. % of B;

0.1-0.3 wt. % of C;

0.2-0.5 wt. % of Ga;

0-0.15 wt. % of O, but not 0;

0.5-1.5 wt. % of Co;

66-68 wt. % of Fe, wt. % refers to the mass percentage in the R-T-B-based permanent magnet material I;

R is a rare earth element, and the R consists of RH, Pr and Nd;

RH is a heavy rare earth element, and RH is Tb, Dy or a combination of Tb and Dy; the content of RH is 0.5-1.2 wt. %;

the R-T-B-based permanent magnet material I has Cu—Ti—C grain boundary phase at the grain boundary of the magnet, which is formed in grain boundary diffusion process.

2. The R-T-B-based permanent magnet material I according to claim 1, wherein, the content of R is 30-32.5 wt. %, wt. % refers to the mass percentage in the R-T-B-based permanent magnet material I;

or, the content of Cu is 0.3-0.45 wt. % or 0.5 wt. %, wt. % refers to the mass percentage in the R-T-B-based permanent magnet material I;

or, the Ti content is 0.1-0.2 wt. %, wt. % refers to the mass percentage in the R-T-B-based permanent magnet material I;

or, the content of B is 0.9-1.0 wt. %, wt. % refers to the mass percentage in the R-T-B-based permanent magnet material I;

or, the content of C is 0.1-0.2 wt. %, wt. % refers to the mass percentage in the R-T-B-based permanent magnet material I.

3. An electronic component, comprising the R-T-B-based permanent magnet material I according to claim 1.

* * * * *